(12) United States Patent
Smith et al.

(10) Patent No.: US 6,741,970 B2
(45) Date of Patent: May 25, 2004

(54) METHOD AND APPARATUS FOR ENHANCED, HIGH SPEED UPDATING AND STORING OF E-COMMERCE ORDERS IN A SERVER

(75) Inventors: Gordon James Smith, Rochester, MN (US); Hal Hjalmar Ottesen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 637 days.

(21) Appl. No.: 09/792,978

(22) Filed: Feb. 26, 2001

(65) Prior Publication Data

US 2002/0120524 A1 Aug. 29, 2002

(51) Int. Cl.[7] .......................... G06F 17/60; G06F 12/00
(52) U.S. Cl. .......................... 705/26; 711/112; 711/165
(58) Field of Search .................... 705/26, 27; 711/112, 711/165

(56) References Cited

U.S. PATENT DOCUMENTS

| | | | |
|---|---|---|---|
| 5,463,758 A | * 10/1995 | Ottesen | 711/114 |
| 5,515,500 A | * 5/1996 | Mizuno et al. | 714/7 |
| 5,537,588 A | * 7/1996 | Engelmann et al. | 707/202 |
| 5,551,003 A | * 8/1996 | Mattson et al. | 711/136 |
| 6,026,463 A | * 2/2000 | Klein | 711/4 |
| 6,574,699 B1 | * 6/2003 | Dobbek | 711/4 |

FOREIGN PATENT DOCUMENTS

JP 404265510 A * 9/1992 ............ G11B/5/596

OTHER PUBLICATIONS

Parker, "The many faces of high–density rewritable optical," Jan. 1998, EMedia Professional, vol. 11, No. 1, pp. 60–71.*

Perry, "LS–120 Technology Overview," Summer 1996, Computer Technology Review Office Technologies Supplement, pp. 91–95.*

Glass, "High Performance File System Gets Rid of Ugly FAT," May 1991, InfoWorld, vol. 13, No. 19, p. S10.*

* cited by examiner

Primary Examiner—Bryan J Jaketic
(74) Attorney, Agent, or Firm—Joan Pennington (57) ABSTRACT

A method and apparatus are provided for implementing enhanced, high speed updating and storing of electronic-commerce orders in a server computer system. A received electronic-commerce order is stored in a predetermined temporary read/write cylinder of a disk drive. Responsive to identifying that the predetermined temporary read/write cylinder is full, the stored electronic-commerce order is read. A customer type for the electronic-commerce order is identified. Responsive to identifying a predefined first customer type for the electronic-commerce order, the electronic-commerce order is transferred from the predetermined temporary read/write cylinder to a selected cylinder within a set number of cylinders from the predetermined temporary read/write cylinder. Responsive to identifying a predefined second customer type for the electronic-commerce order, the electronic-commerce order is transferred from the predetermined temporary read/write cylinder to a selected cylinder more than the set number of cylinders from the predetermined temporary read/write cylinder.

22 Claims, 11 Drawing Sheets

FIG. 1

CUSTOMER ORDER INFORMATION 200

| DATA FIELDS | SIZE (BYTES) |
|---|---|
| CUSTOMER NUMBER | 8 |
| PASSWORD | 8 |
| ORDER NUMBERS | 10 |
| ITEM NUMBERS | 8 - 80 |
| QUANTITIES | 4 - 40 |
| CHARGES | 10 |
| CREDIT CARD NUMBER | 20 |
| SHIPPING/TRACKING NUMBERS | 20 - 40 |
| STATISTICS | 20 |

EXEMPLARY DATA PARTITIONING 300 IN SERVER SYSTEM 100 ON A SINGLE RAID DISK DRIVE

| CYLINDER # | DESCRIPTION |
| --- | --- |
| 1 - 490 | ORDER-DATA FROM MEDIUM AND SMALL CUSTOMERS STORED BY CUSTOMER NUMBER |
| 491 - 499 | ORDER-DATA FROM FREQUENT AND LARGE CUSTOMERS STORED BY CUSTOMER NUMBER |
| 500 | TEMPORARY WRITE/READ STORAGE ORDER-DATA |
| 501-509 | ORDER-DATA FROM FREQUENT AND LARGE CUSTOMERS STORED BY CUSTOMER NUMBER |
| 510-999 | ORDER-DATA FROM MEDIUM AND SMALL CUSTOMERS STORED BY CUSTOMER NUMBER |
| 1,000-12,000 | MULTIMEDIA DATA (ONLINE CATALOGS) AND OTHER RECORDS |

FIG. 4

ACCUMULATED ACCES TIME EXAMPLE 400 FOR UPDATING 7,200 CUSTOMER ORDERS

| METHOD | TIME | DESCRIPTION |
|---|---|---|
| RANDOM UPDATES | 68.9 | TRAVERSE ACCESS TIME AND LATENCY TIME |
| ENHANCED UPDATES | 34.4 | TRAVERSE ACCESS TIME AND LATENCY TIME WITH TRANSFER FROM RAM TO CYLINDER 500 |

FIG. 5

EXEMPLARY DATA PARTITIONING 500 IN SERVER SYSTEM 100 ON THREE RAID DISK DRIVES

| CYLINDER # | DESCRIPTION |
|---|---|
| 1 - 163 | ORDER-DATA FROM MEDIUM AND SMALL CUSTOMERS STORED BY CUSTOMER NUMBER |
| 164 - 166 | ORDER-DATA FROM FREQUENT AND LARGE CUSTOMERS STORED BY CUSTOMER NUMBER |
| 167 | TEMPORARY WRITE/READ STORAGE ORDER-DATA |
| 168 - 170 | ORDER-DATA FROM FREQUENT AND LARGE CUSTOMERS STORED BY CUSTOMER NUMBER |
| 171- 333 | ORDER-DATA FROM MEDIUM AND SMALL CUSTOMERS STORED BY CUSTOMER NUMBER |
| 334-12,000 | MULTIMEDIA DATA (ONLINE CATALOGS) AND OTHER RECORDS |

FIG. 6

ACCUMULATED ACCES TIME EXAMPLE 600 FOR UPDATING 7,200 CUSTOMER ORDERS ON THREE RAID DISK DRIVES

| METHOD | TIME | DESCRIPTION |
|---|---|---|
| RANDOM UPDATES | 23.1 | TRAVERSE ACCESS TIME AND LATENCY TIME |
| ENHANCED UPDATES | 10.0 | TRAVERSE ACCESS TIME AND LATENCY TIME WITH TRANSFER FROM RAM TO CYLINDER 167 |

METHOD AND APPARATUS FOR ENHANCED, HIGH SPEED UPDATING AND STORING OF E-COMMERCE ORDERS IN A SERVER

FIELD OF THE INVENTION

The present invention relates generally to the data processing field, and more particularly, relates to a method and apparatus for implementing enhanced, high speed updating and storing of electronic-commerce (E-commerce) orders in a server.

DESCRIPTION OF THE RELATED ART

As a result of tremendous growth in transaction volume of E-commerce orders, it is increasingly important to provide computer systems capable of supporting the E-commerce traffic reliably and expediently.

It is expected that most of the online catalogs and order/shipping data will be stored on servers including redundant arrays of inexpensive disks (RAID). A common annoyance among E-commerce shoppers accessing a web site is the delay in service. The Internet response-time in establishing contact between the user or customer and the web site or E-commerce store is normally fast. However, the delay in getting data for browsing and for order processing typically is due to RAID system servers. Much of the server delay time is due to the mechanical actuator transverse access time and spindle rotational time of the hard disk drives (HDD). For example, the average 3.5 inch form factor HDD access time, that is the time for the head to traverse about ⅓ of the disk surface databand, typically is 3–5 milliseconds. An HDD operating at 10,000 revolutions per minute (RPM) will make one revolution in 6 milliseconds.

In RAID systems during peak periods, these mechanical access times for rotational and transverse motion accumulate, when simultaneously serving many customers.

It is desirable to minimize the effect of these mechanical access times on the E-commerce performance. A need exists for a mechanism for implementing enhanced, high speed updating and storing of E-commerce orders in a server.

SUMMARY OF THE INVENTION

A principal object of the present invention is to provide a method and apparatus for implementing enhanced, high speed updating and storing of electronic-commerce orders in a server. Other important objects of the present invention are to provide such method and apparatus for implementing enhanced, high speed updating and storing of electronic-commerce orders in a server substantially without negative effect and that overcome many of the disadvantages of prior art arrangements.

In brief, a method and apparatus are provided for implementing enhanced, high speed updating and storing of electronic-commerce orders in a server computer system. A received electronic-commerce order is stored in a predetermined temporary read/write cylinder of a disk drive. Responsive to identifying that the predetermined temporary read/write cylinder is full, the stored electronic-commerce order is read. A customer type for the electronic-commerce order is identified. Responsive to identifying a predefined first customer type for the electronic-commerce order, the electronic-commerce order is transferred from the predetermined temporary read/write cylinder to a selected cylinder within a set number of cylinders from the predetermined temporary read/write cylinder. Responsive to identifying a predefined second customer type for the electronic-commerce order, the electronic-commerce order is transferred from the predetermined temporary read/write cylinder to a selected cylinder more than the set number of cylinders from the predetermined temporary read/write cylinder.

In accordance with features of the invention, the predefined first customer type includes a large and/or frequent customer and the predefined second customer type includes a smaller or medium size customer. For the large and/or frequent customer, the transverse access time is shorter for the transfer from the predetermined temporary read/write cylinder to a selected cylinder within the set number of cylinders from the predetermined temporary read/write cylinder. During idle time of the server computer system, electronic-commerce orders are read and transferred from the predetermined temporary read/write cylinder to the selected cylinders according to customer type.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
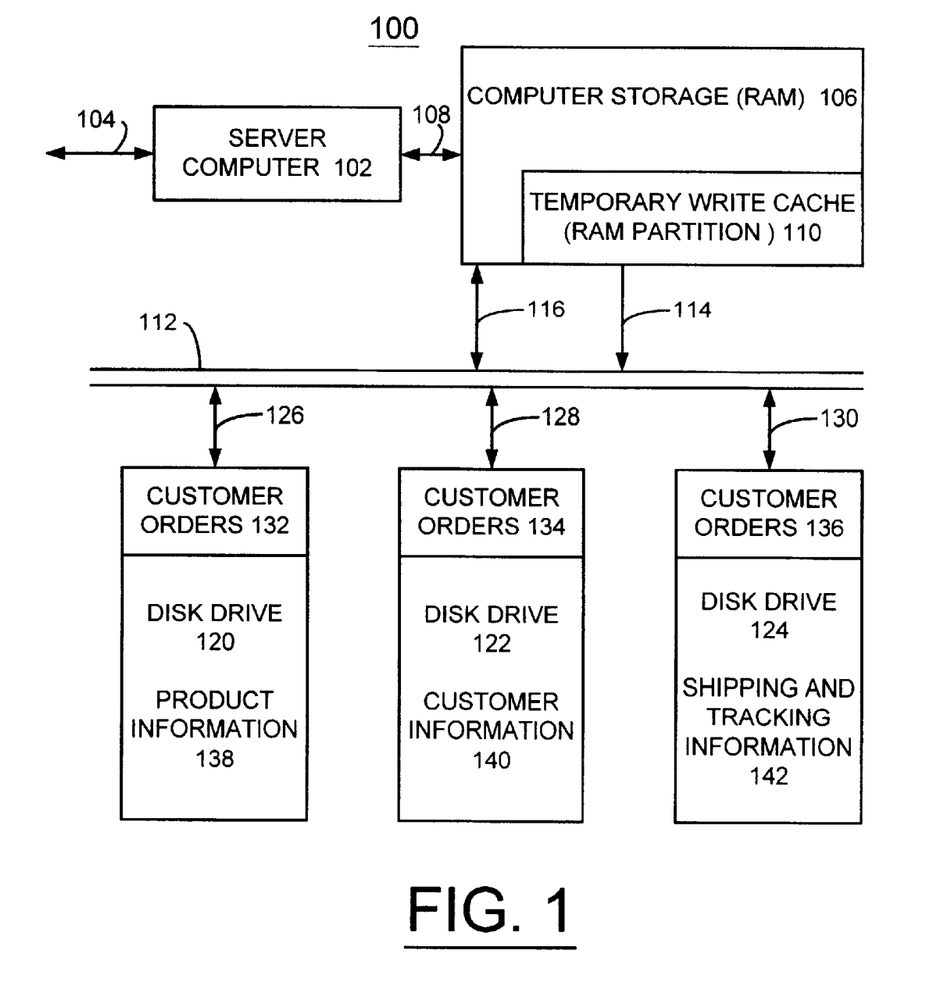
FIG. 1 is a block diagram representation illustrating a server computer system for implementing methods for enhanced, high speed updating and storing of electronic-commerce (E-commerce) orders in accordance with the preferred embodiment.

Having reference now to the drawings, in FIG. 1, there is shown a server computer or data processing system of the preferred embodiment generally designated by the reference character 100. As shown in FIG. 1, computer system 100 includes a server computer 102 receiving a randomly occurring data stream on an input bus 104 from online customers wanting to shop and place orders. The server computer 102 is coupled to a main computer storage or random access memory (RAM) 106 on a bus line 108. The main memory 106 includes a temporary write cache 110, such as a 2 mega-bytes (MB) partition. Write cache partition 110 is sufficient to store 7,200 separate orders of 10 items or less, with information as illustrated and described with respect to FIG. 2. The cache partition 110 is connected to a RAID bus 112 on a line bus 114 and the rest of main memory 106 is connected to the RAID bus 112 via a line bus 116. As shown, a plurality of disk drives 120, 122, and 124 of the E-commerce server computer system 100 are connected to the RAID bus 112 via a corresponding one of line buses 126, 128 and 130. As shown, disk drives 120, 122, and 124 respectively store customer orders 132, 134 and 136, and product information 138, customer information 140, and shipping and tracking information 142.

Server computer 102 is suitably programmed to execute the flow charts of FIGS. 7A, 7B, 8A, and 8B of the preferred embodiment. Computer 100 may be implemented using any suitable computer, such as an IBM AS/400.

Figure 2:
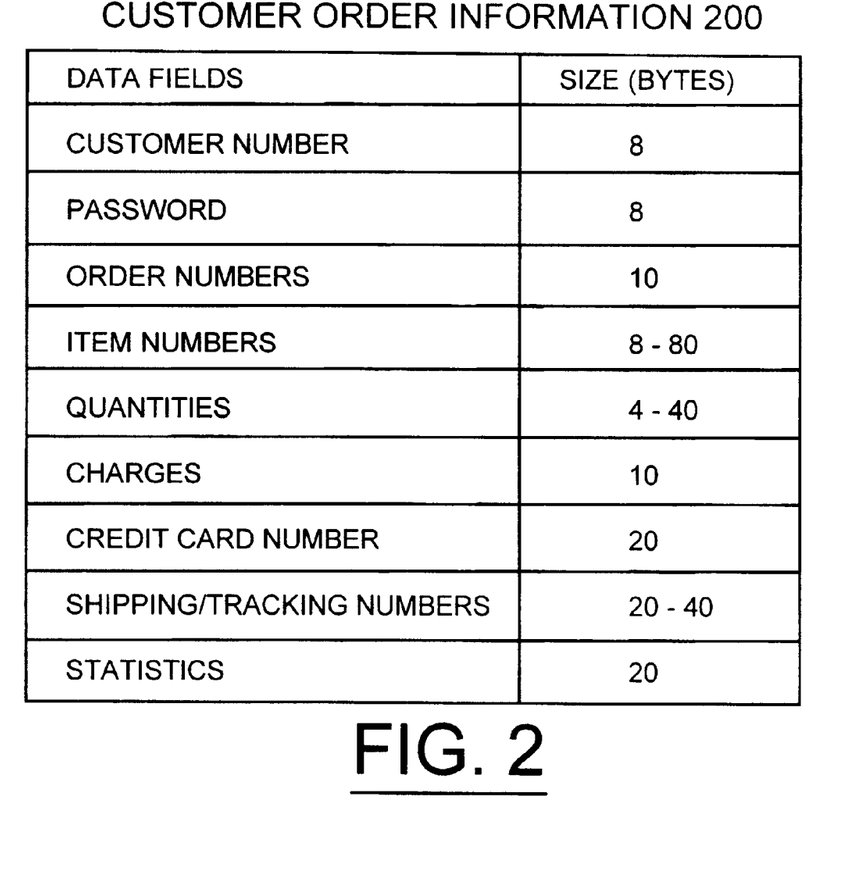
FIG. 2 is a diagram illustrating customer order information in the E-commerce server computer system of FIG. 1 in accordance with the preferred embodiment.

FIG. 2 illustrates customer order information in the E-commerce server computer system 100 in accordance with the preferred embodiment generally designated by the reference character 200. The customer order information 200 includes multiple data fields of predetermined size. The customer order information 200 includes a customer number. Data is presorted and stored according to customer number. The customer order information 200 includes a password, order numbers, item numbers, quantities, charges, a credit card number, shipping/tracking numbers, and statistics.

Figure 3:
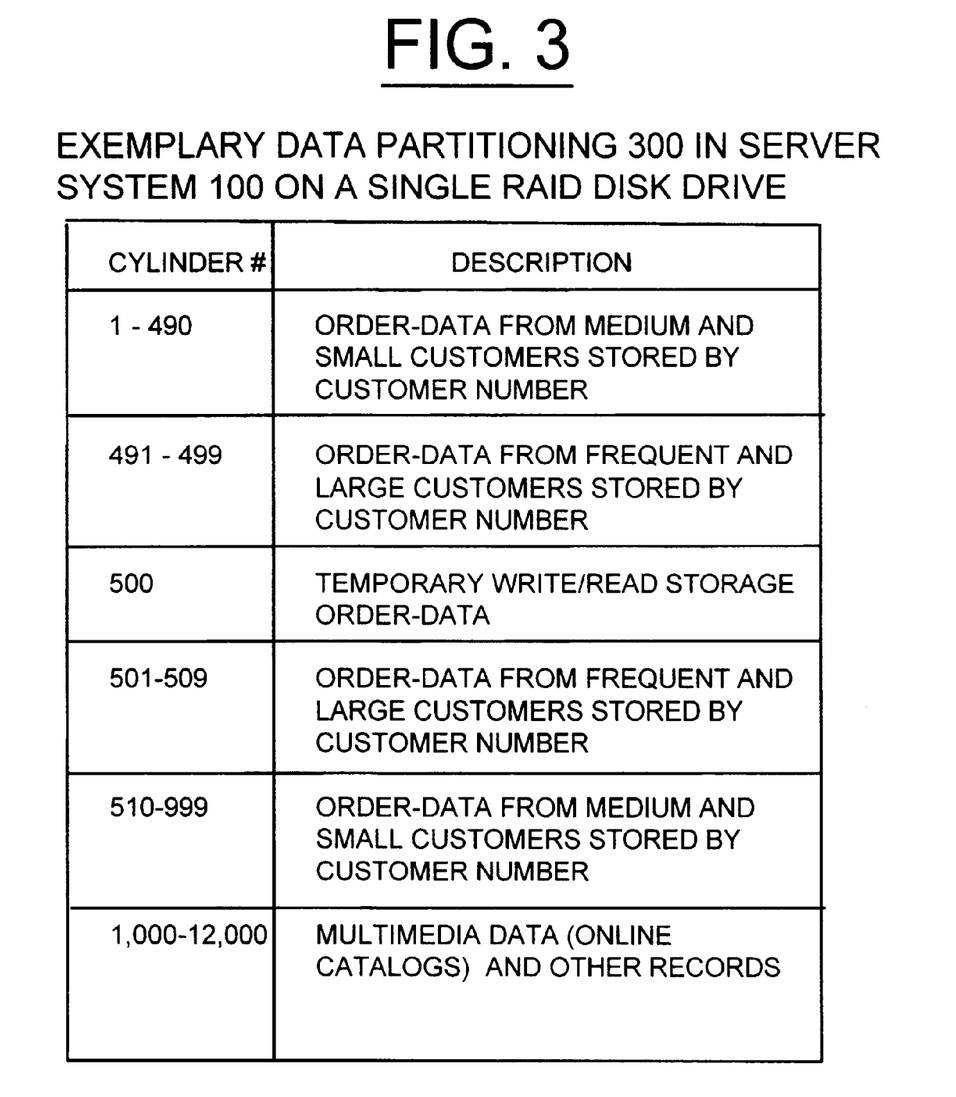
FIG. 3 is a diagram illustrating exemplary partitioning of data on a single RAID disk drive in the E-commerce server computer system of FIG. 1 in accordance with the preferred embodiment.

FIG. 3 illustrates exemplary partitioning of data on a single RAID disk drive in the E-commerce server computer system 100 in accordance with the preferred embodiment generally designated by the reference character 300. For example, only one disk drive, such as disk drive 120 in system 100 is used for storing customer orders. In the partitioning 300 as shown, the contents of the outer-diameter cylinders of the disk drive are only intended as an example. It should be understood that inner-diameter cylinders of the disk drive can be used for storing customer orders and the number of cylinders could be smaller or larger. In FIG. 3, a total number of 12,000 cylinders for the disk drive 120 is shown with the customer order partition 132 of the first 999 outer-diameter cylinders and product information 138 of cylinders 1,000–12,000.

As shown in FIG. 3, cylinder 500 serves as a temporary write/read storage or cache for new online orders and has around 2 MB or generally equivalent to the capacity of the write cache 110 of main memory 106. Once the write cache 110 has been filled, its data is temporarily transferred to cylinder 500 in batch form. This process takes about 20×6= 120 milliseconds for a 10-disk HDD 120 with 20 recording heads. Then data are stored in the cylinders as designated in FIG. 3 by customer number. Small and medium sized customers have predefined cylinders 1–490 and 510–999 assigned for order data. Each customer with a customer number is assigned a predefined size block, such as 256-byte block with possible extensions of 256-byte blocks for orders larger than 10 items. During idle times of server computer 102 or when the write cache 110 is close to being full, all or some of the customer order data on the temporary read/write cylinder 500 is transferred to respective locations of FIG. 3, using a local HDD write buffer (not shown).

Larger and more frequent customers are assigned several 256 byte blocks each on predetermined temporary read/write cylinders 491–499 and 501–509. These cylinders 491–499 and 501–509 are closer to cylinder 500 so that the transverse access time is shorter. Customer orders are temporary in nature. When a new order is received, the previous order is typically archived in the customer information partition 140 of disk drive 122. During normal operation, a particular cylinder used for temporary write/read cache shown as temporary write/read cylinder 500 periodically is reallocated to another cylinder to minimize wear.

Figure 4:
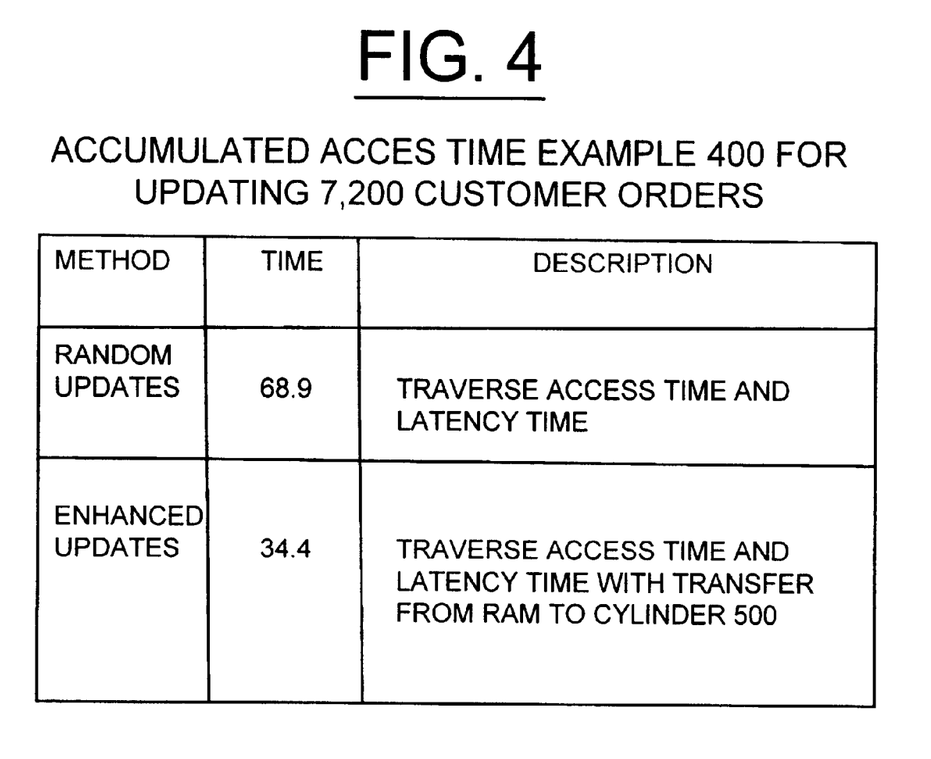
FIG. 4 is a diagram illustrating exemplary accumulated access time for updating 7,200 customer orders on a single RAID disk drive in the E-commerce server computer system of FIG. 3 in accordance with the preferred embodiment in comparison with a random update method.

FIG. 4 illustrates exemplary accumulated access time for updating 7,200 customer orders on a single disk drive in the E-commerce server computer system 100 with the exemplary partitioning 300 of FIG. 3 in comparison with a random update method generally designated by the reference character 400. A simulation of the total access time for randomly updating 7,200 customer orders is 68.9 seconds. A simulation of the total access time for enhanced updating 7,200 customer orders in accordance with the preferred embodiment is 34.4 seconds. The total access time for the enhanced method for updating 7,200 customer orders in accordance with the preferred embodiment is twice as fast as the random update method. In this simulation, the total access time includes the average latency time of 3 milliseconds for a HDD spindle spinning at 10,000 RPM and the transverse access time for seeking from a random cylinder. The average transverse access time, that is the time to seek-settle 4,000 cylinders in a 12,000-cylinder disk drive, has been assumed to be 6.83 milliseconds. The random update method does not include the use of the temporary cylinder 500 and the write cache partition 110. The enhanced method for updating 7,200 customer orders in accordance with the preferred embodiment frees 34.5 seconds per 7,200 customer order updates, thereby allowing the E-commerce server computer 102 to provide better online customer service during peak periods.

Figure 5:
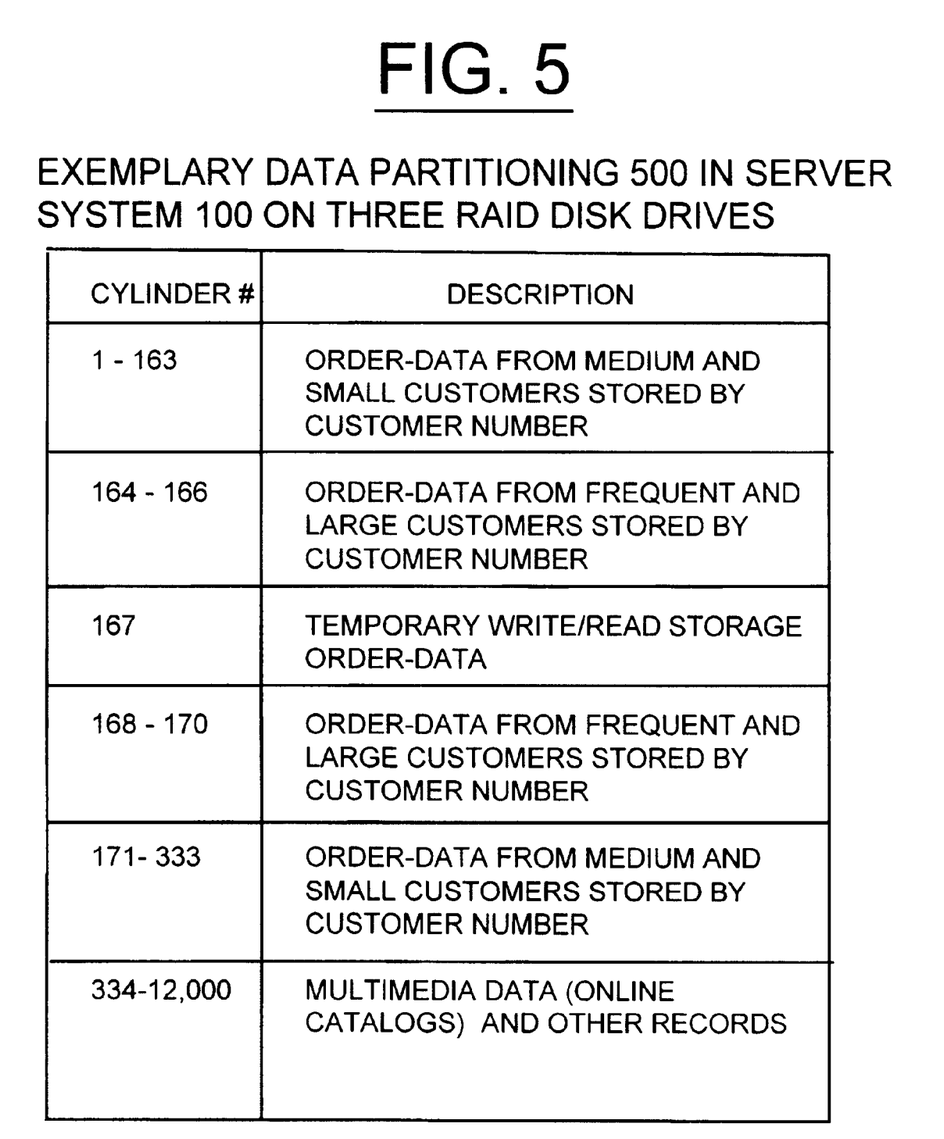
FIG. 5 is a diagram illustrating exemplary partitioning of data on three RAID disk drives in the E-commerce server computer system of FIG. 1 in accordance with the preferred embodiment.

FIG. 5 illustrates exemplary partitioning of data on three RAID disk drives in the E-commerce server computer system 100 in accordance with the preferred embodiment generally designated by the reference character 500. For example, three disk drives, such as disk drives 120, 122 and 124 in system 100 are used for storing customer orders. In the partitioning 500 as shown, the 333 cylinders used for storing customer order updates are only intended as an example. It should be understood that the number of cylinders could be smaller or larger. In FIG. 5, a total number of 12,000 cylinders for each of the disk drives 120, 122 and 124 is shown with the customer order partitions 132, 134 and 136 of the first 333 outer-diameter cylinders and multimedia data including product information 138, customer information 140 and shipping and tracking information 142 of cylinders 334–12,000. Most of the time the disk drives 120,122 and 124 are randomly accessing cylinders 334–12, 000.

As shown in FIG. 5, cylinder 167 on each disk drive serves as a temporary write/read storage or cache of new online orders and has around 2 MB or generally equivalent to the capacity of the write cache 110 of main memory 106. The customer orders in the write cache 110 are dynamically partitioned into three parts according to customer number. Once the write cache 110 has been filled, its data is transferred in batch form and distributed to disk drives 120, 122, and 124 on temporary write/read cylinder 167. This process takes about 20×6=120 milliseconds for a 10-disk HDD 120 with 20 recording heads. Then data are stored in the cylinders as designated in FIG. 5 by customer number. Small and medium sized customers have predefined cylinders 1–163 and 171–333 assigned for order data. Each customer with a customer number is assigned a predefined size block, such as 256-byte block with possible extensions of 256-byte blocks for orders larger than 10 items. During idle times of server computer 102 or when the write cache 110 is close to being full, all or some of the data on temporary write/read cylinder 167 is transferred to respective locations of FIG. 5, using a local HDD write buffer (not shown).

Larger and more frequent customers are assigned several 256 byte blocks each on predetermined temporary read/write cylinders 164–166 and 168–170. These cylinders 164–166 and 168–170 are closer to temporary write/read cylinder 167 so that the transverse access time is shorter. Customer orders are temporary in nature. When a new order is received, the previous order is typically archived in the customer information partition 140 of disk drive 122. During normal operation, a particular cylinder used for temporary write/read cache shown as cylinder 167 periodically is reallocated to another cylinder to minimize wear.

Figure 6:
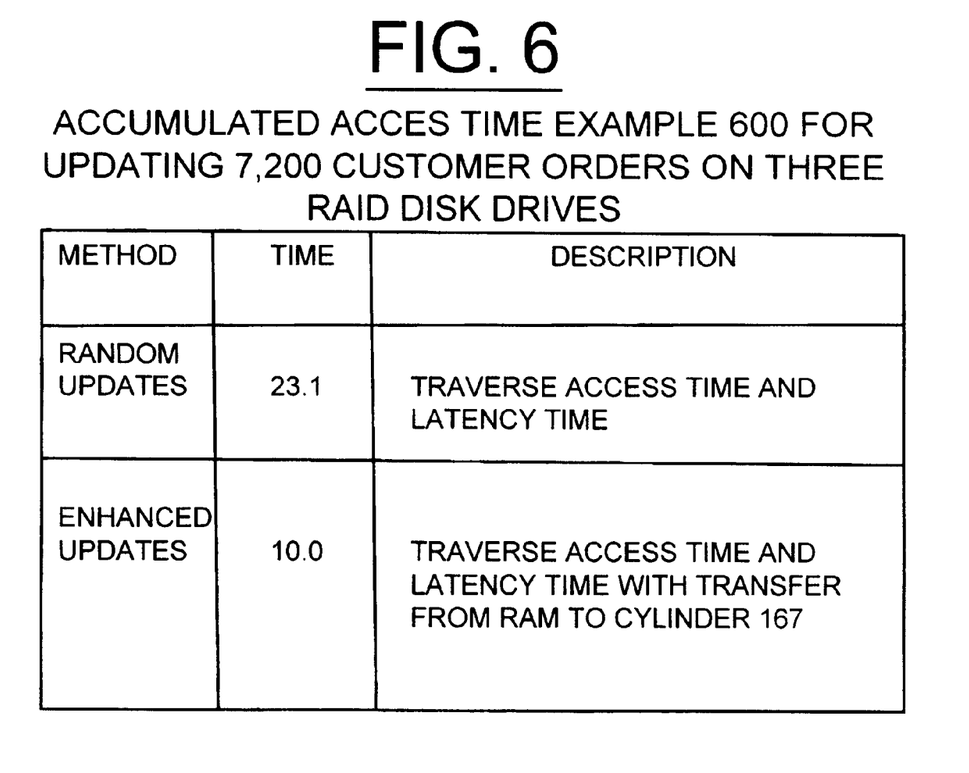
FIG. 6 is a diagram illustrating exemplary accumulated access time for updating 7,200 customer orders on three RAID disk drives in the E-commerce server computer system of FIG. 5 in accordance with the preferred embodiment in comparison with a random update method.

FIG. 6 illustrates exemplary accumulated access time for updating 7,200 customer orders on three RAID disk drives in the E-commerce server computer system 100 for the exemplary partition 500 of FIG. 5 in accordance with the preferred embodiment in comparison with a random update method generally designated by the reference character 600. The same disk drive operating times as described with respect to FIG. 3 are used for the simulation of FIG. 6. A simulation of the total access time for randomly updating 7,200 customer orders on three RAID disk drives is 23.1 seconds. A simulation of the total access time for enhanced updating 7,200 customer orders on three RAID disk drives in accordance with the preferred embodiment is 10.0 seconds. The total access time for the enhanced method for updating 7,200 customer orders in accordance with the preferred embodiment is over twice as fast as the random update method. The enhanced method for updating 7,200 customer orders in accordance with the preferred embodiment speeds up the updating and storing of new customer orders, allowing the E-commerce server computer 102 to provide better online customer service during peak periods.

Figure 7A:
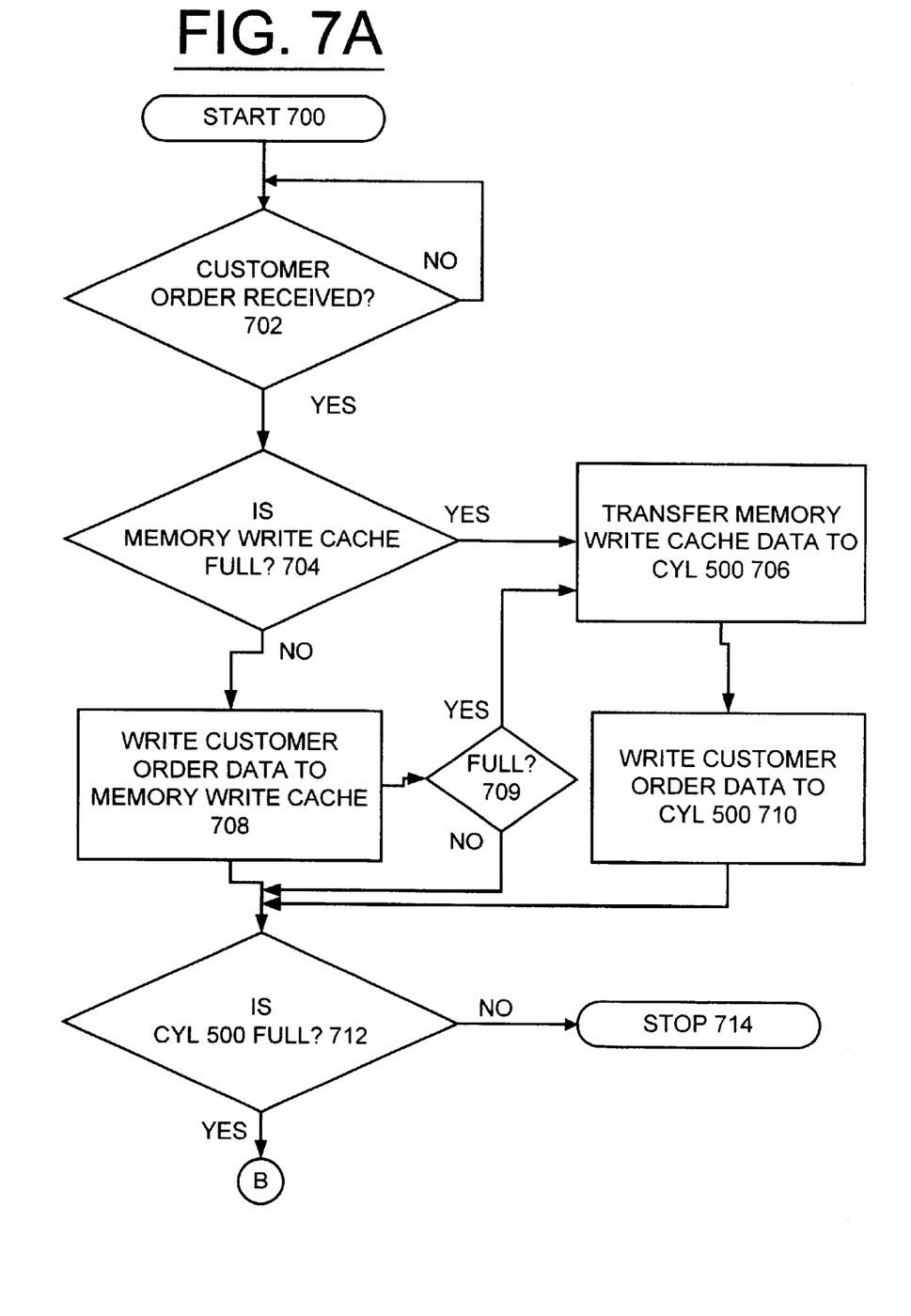
FIGS. 7A, 7B, 8A, and 8B are flow charts illustrating exemplary sequential steps for enhanced, high speed updating and storing of electronic-commerce (E-commerce) orders in accordance with the preferred embodiment.
Figure 7B:
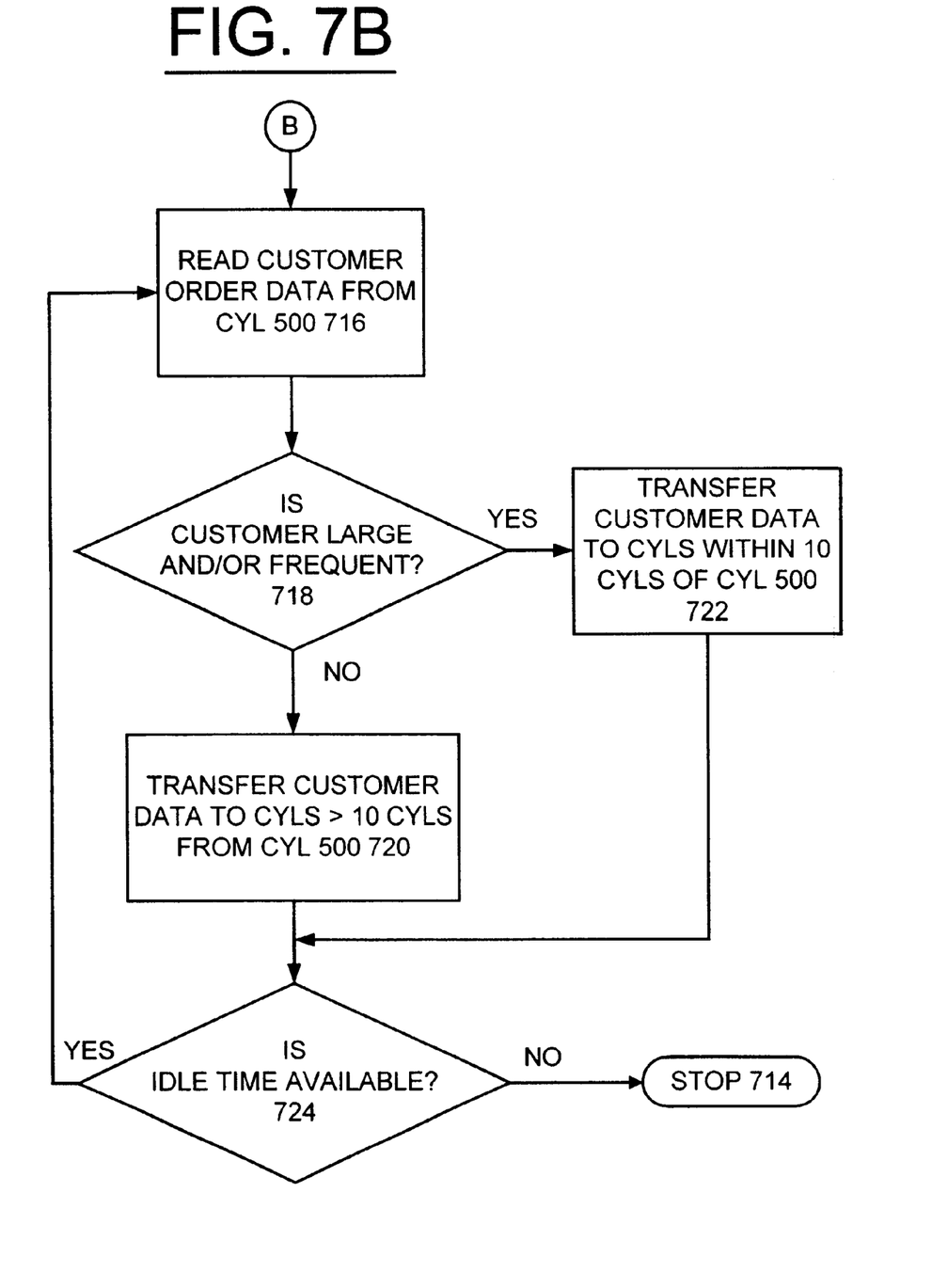

Referring now to FIGS. 7A and 7B, there are shown exemplary sequential steps for enhanced, high speed updating and storing of electronic-commerce orders in accordance with the preferred embodiment starting at block 700. In FIGS. 7A and 7B, a single disk drive, such as drive 120 is used with exemplary partitioning 300 as described above with respect to FIGS. 3 and 4. Checking for a received customer order is performed as indicated in a decision block 702. When a customer order is received, checking whether the memory write cache 110 has reached a predefined threshold storage level for full as indicated in a decision block 704. If the memory write cache 110 is full, then memory write cache data is transferred to temporary read/write cylinder 500 as indicated in a block 706. If the memory write cache 110 is not full, then the customer order data is written to the memory write cache 110 as indicated in block 708. If the memory cache 110 fills during the writing of customer order data as indicated in a decision block 709, the customer order data is written to the temporary read/write cylinder 500 at blocks 706. Then the customer order is written to the temporary read/write cylinder 500 as indicated in a block 710. Checking whether the temporary read/write cylinder 500 has reached a predefined threshold storage level for full is performed as indicated in a decision block 712. When the temporary read/write cylinder 500 is not full, then the sequential steps end as indicated in a block 714. When the temporary read/write cylinder 500 is full, then the sequential steps continue following entry point B in FIG. 7B.

Referring to FIG. 7B, next customer order data is read from the temporary read/write cylinder 500 as indicated in a block 716. Checking whether the customer is a large and/or a frequent customer is performed as indicated in a decision block 718. When the customer is not a large and/or a frequent customer, then the customer order data is transferred to cylinders greater than 10 cylinders from the temporary read/write cylinder 500 as indicated in a block 720. When the customer is a large and/or a frequent customer, then the customer order data is transferred to cylinders within 10 cylinders of cylinder 500 as indicated in a block 722. After the data is transferred at block 720 or 722, then checking whether idle time is available as indicated in a decision block 724. If idle time is available, then the sequential operations return to block 718 to read and transfer additional customer order data. Otherwise, if idle time is not available, then the sequential operations end as indicated in block 714.

Figure 8A:
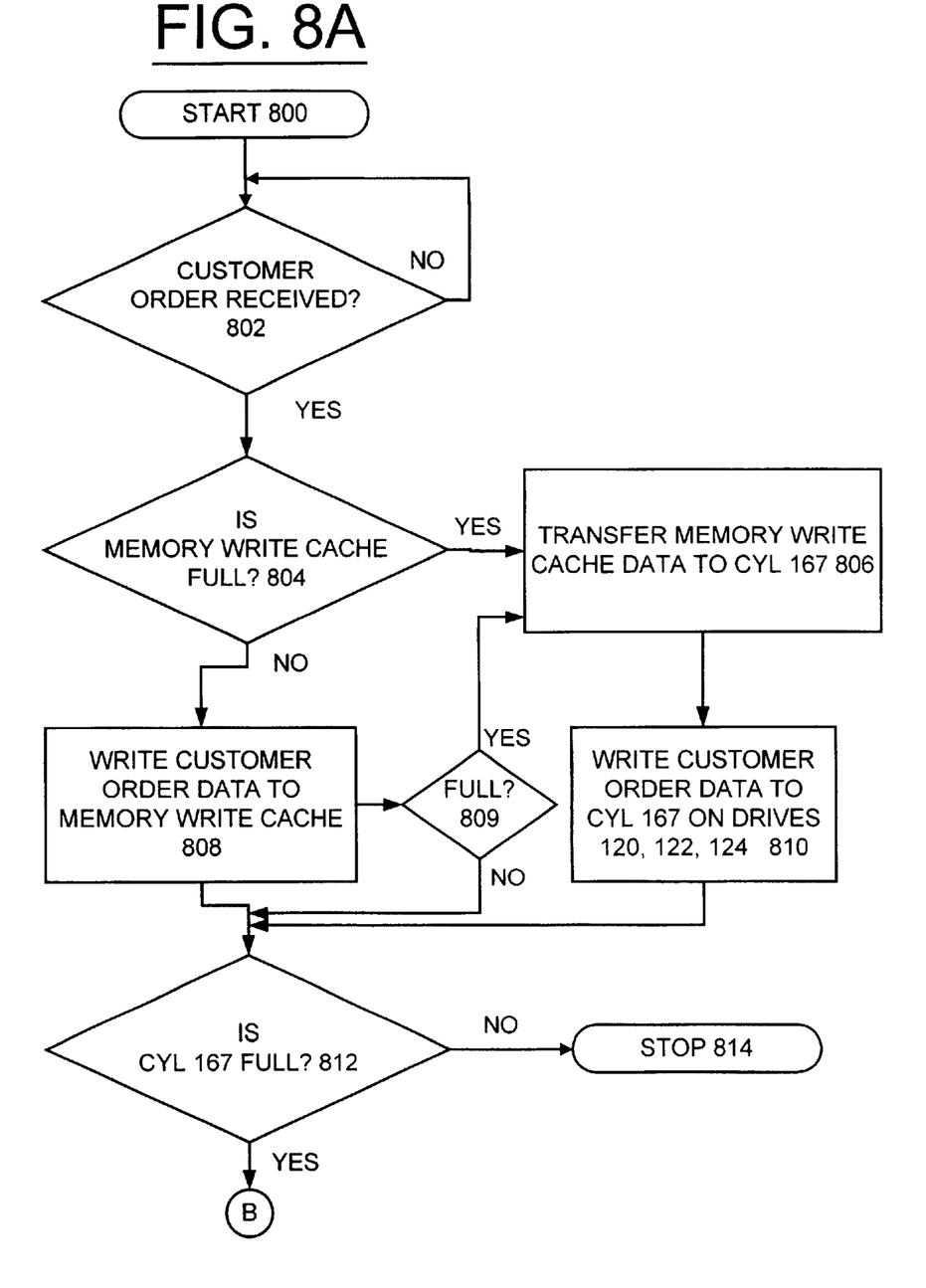
Figure 8B:
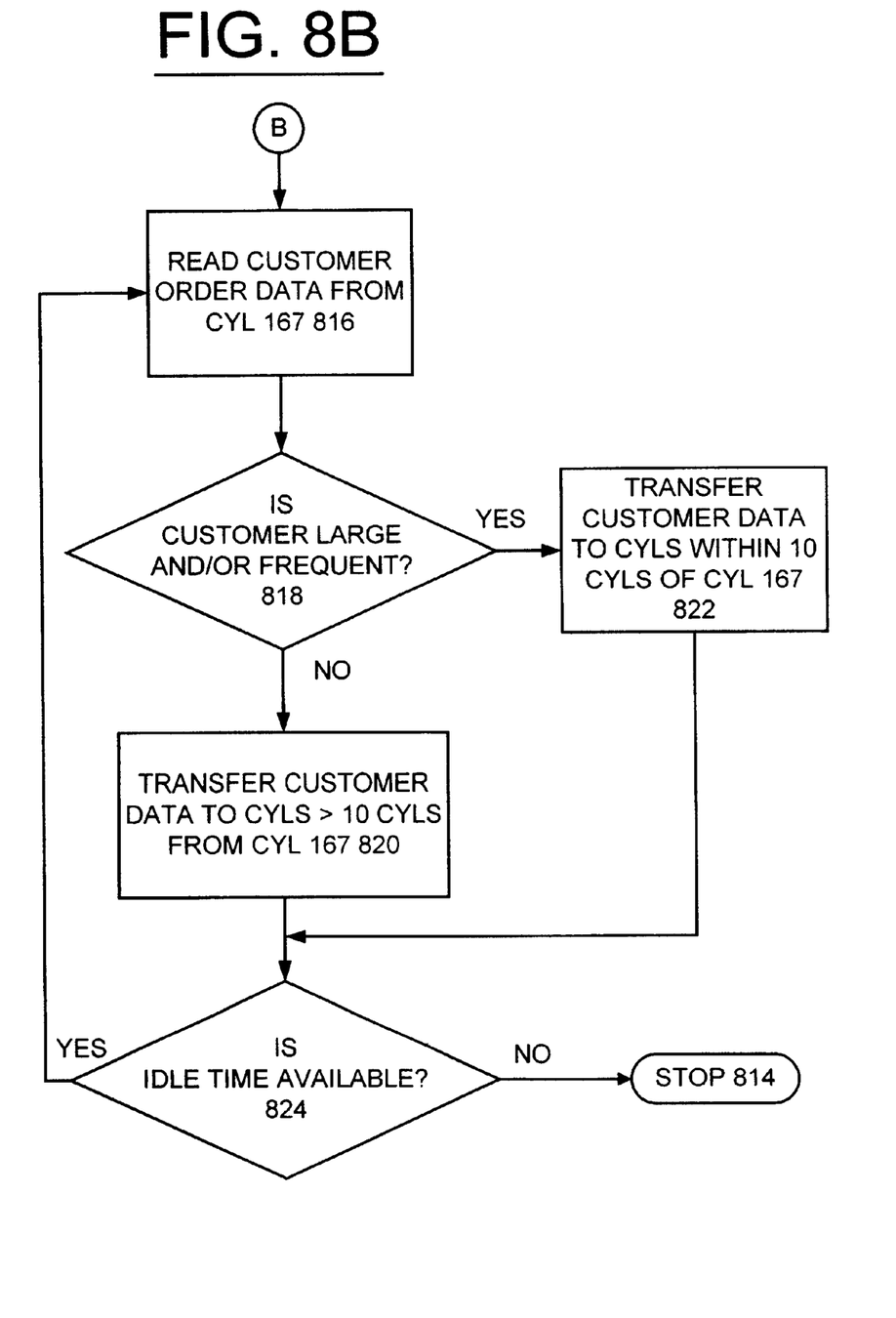

Referring now to FIGS. 8A and 8B, there are shown exemplary sequential steps for enhanced, high speed updating and storing of electronic-commerce orders in accordance with the preferred embodiment starting at block 800. In FIGS. 8A and 8B, three disk drives 120,122 and 124 are used with exemplary partitioning 500 as described above with respect to FIGS. 5 and 6. Checking for a received customer order is performed as indicated in a decision block 802. When a customer order is received, checking whether the memory write cache 110 has reached a predefined threshold storage level for full as indicated in a decision block 804. If the memory write cache 110 is full, then memory write cache data is transferred to the temporary read/write cylinder 167 as indicated in a block 806. If the memory write cache 110 is not full, then the customer order data is written to either the memory write cache 110 as indicated in block 808. If the memory cache 110 fills during the writing of customer order data as indicated in a decision block 809, the customer order data is written to the temporary read/write cylinder 167 at blocks 806. Then the customer order is written to the temporary read/write cylinder 167 as indicated in a block 810. Checking whether the temporary read/write cylinder 167 has reached a predefined threshold level for full is performed as indicated in a decision block 812. When the temporary read/write cylinder 167 is not full, then the sequential steps end as indicated in a block 814. When the temporary read/write cylinder 167 is full, then the sequential steps continue following entry point B in FIG. 8B.

Referring to FIG. 8B, next customer order data is read from the temporary read/write cylinder 167 as indicated in a block 816. Checking whether the customer is a large and/or a frequent customer is performed as indicated in a decision block 818. When the customer is not a large and/or a frequent customer, then the customer order data is transferred to cylinders greater than 10 cylinders from the temporary read/write cylinder 167 as indicated in a block 820. When the customer is a large and/or a frequent customer, then the customer order data is transferred to cylinders within 10 cylinders of the temporary read/write cylinder 167 as indicated in a block 822. After the data is transferred at block 820 or 822, then checking whether idle time is available as indicated in a decision block 824. If idle time is available, then the sequential operations return to block 818 to read and transfer additional customer order data. Otherwise, if idle time is not available, then the sequential operations end as indicated in block 814.

Figure 9:
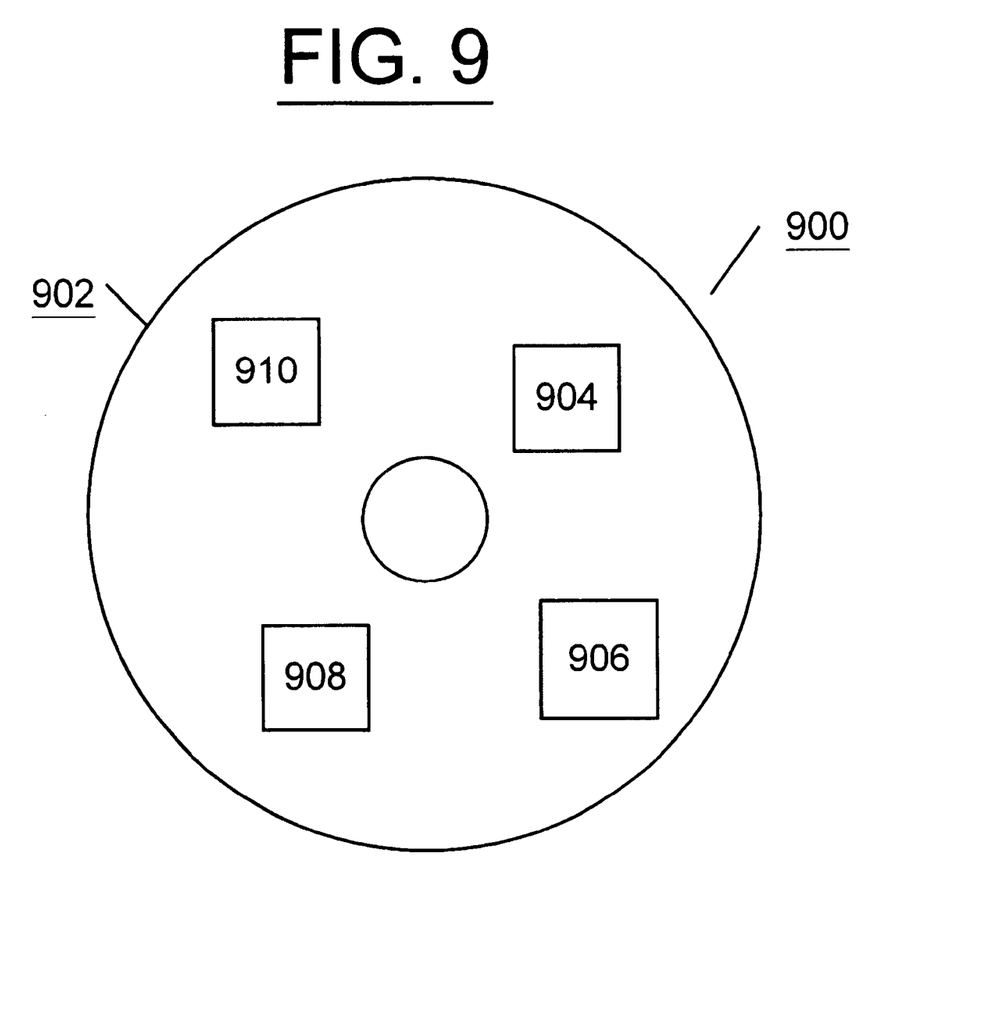
FIG. 9 is a block diagram illustrating a computer program product in accordance with the preferred embodiment.

Referring now to FIG. 9, an article of manufacture or a computer program product 900 of the invention is illustrated. The computer program product 900 includes a recording medium 902, such as, a floppy disk, a high capacity read only memory in the form of an optically read compact disk or CD-ROM, a tape, a transmission type media such as a digital or analog communications link, or a similar computer program product. Recording medium 902 stores program means 904, 906, 908, 910 on the medium 902 for carrying out the methods for enhanced, high speed updating and storing of electronic-commerce orders of the preferred embodiment in the server computer system 100 of FIG. 1.

A sequence of program instructions or a logical assembly of one or more interrelated modules defined by the recorded program means 904, 906, 908, 910, direct the computer system 100 for implementing enhanced, high speed updating and storing of electronic-commerce orders of the preferred embodiment.

While the present invention has been described with reference to the details of the embodiments of the invention shown in the drawing, these details are not intended to limit the scope of the invention as claimed in the appended claims.

What is claimed is:

1. A method for implementing enhanced, high speed updating and storing of electronic-commerce orders in a server computer system comprising the steps of:

receiving an electronic-commerce order;

storing said received electronic-commerce order in a predetermined temporary read/write cylinder of a disk drive;

identifying a predefined storage threshold level for said predetermined temporary read/write cylinder;

responsive to identifying said predefined threshold level, reading said stored electronic-commerce order;

identifying a customer type for said electronic-commerce order;

responsive to identifying a predefined first customer type for said electronic-commerce order, and transferring said electronic-commerce order from said predetermined temporary read/write cylinder to a selected cylinder within a set number of cylinders from said predetermined temporary read/write cylinder; and responsive to identifying a predefined second customer type for said electronic-commerce order, and transferring said electronic-commerce order from said predetermined temporary read/write cylinder to a selected cylinder more than said set number of cylinders from said predetermined temporary read/write cylinder.

2. A method for implementing enhanced, high speed updating and storing of electronic-commerce orders as recited in claim 1 further includes the step of storing said received electronic-commerce order in a main memory cache and wherein the step of storing said received electronic-commerce order in said predetermined temporary read/write cylinder of said disk drive includes the step of transferring said stored electronic-commerce order from said main memory cache to said predetermined temporary read/write cylinder of said disk drive.

3. A method for implementing enhanced, high speed updating and storing of electronic-commerce orders as recited in claim 1 further includes the step of identifying idle time available in the server computer system and reading stored electronic-commerce order; identifying said predefined first customer type for said electronic-commerce order, and transferring said electronic-commerce order from said predetermined temporary read/write cylinder to said selected cylinder within a set number of cylinders from said predetermined temporary read/write cylinder; and identifying said predefined second customer type for said electronic-commerce order, and transferring said electronic-commerce order from said predetermined temporary read/write cylinder to said selected cylinder more than said set number of cylinders from said predetermined temporary read/write cylinder.

4. A method for implementing enhanced, high speed updating and storing of electronic-commerce orders as recited in claim 1 wherein the step of storing said received electronic-commerce order in said predetermined temporary read/write cylinder of said disk drive includes the step of storing said received electronic-commerce order in said predetermined temporary read/write cylinder of one of a plurality of disk drives.

5. A method for implementing enhanced, high speed updating and storing of electronic-commerce orders as recited in claim 1 storing said received electronic-commerce order in said predetermined temporary read/write cylinder of said disk drive includes the steps of defining a number of outer diameter (OD) cylinders for storing electronic-commerce orders and defining said predetermined temporary read/write cylinder generally near the middle of said number of outer diameter (OD) cylinders.

6. A method for implementing enhanced, high speed updating and storing of electronic-commerce orders as recited in claim 5 includes the step of defining a first 1,000 outer diameter (OD) cylinders for storing electronic-commerce orders and defining said predetermined temporary read/write cylinder generally near outer diameter cylinder 500.

7. A method for implementing enhanced, high speed updating and storing of electronic-commerce orders as recited in claim 5 defining a first 333 outer diameter (OD) cylinders for storing electronic-commerce orders in a plurality of disk drives and defining said predetermined temporary read/write cylinder generally near outer diameter cylinder 167.

8. A method for implementing enhanced, high speed updating and storing of electronic-commerce orders as recited in claim 1 storing said received electronic-commerce order in said predetermined temporary read/write cylinder of said disk drive includes the steps of defining a number of inner diameter (ID) cylinders for storing electronic-commerce orders and defining said predetermined temporary read/write cylinder generally near the middle of said number of inner diameter (ID) cylinders.

9. A method for implementing enhanced, high speed updating and storing of electronic-commerce orders as recited in claim 8 includes the step of defining a first 1,000 inner diameter (ID) cylinders for storing electronic-commerce orders and defining said predetermined temporary read/write cylinder generally near the middle of said first 1,000 inner diameter (ID) cylinders.

10. A method for implementing enhanced, high speed updating and storing of electronic-commerce orders as recited in claim 1 wherein said predefined first customer type is a large sized or frequent customer.

11. A method for implementing enhanced, high speed updating and storing of electronic-commerce orders as recited in claim 1 wherein said predefined second customer type is a small or medium sized customer.

12. A method for implementing enhanced, high speed updating and storing of electronic-commerce orders as recited in claim 1 further includes the step of storing product information on a predefined number of inner diameter (ID) cylinders in said disk drive.

13. A method for implementing enhanced, high speed updating and storing of electronic-commerce orders as recited in claim 1 further includes the step of periodically reallocating said predetermined temporary read/write cylinder of said disk drive to another cylinder, whereby wear is minimized.

14. Apparatus for implementing enhanced, high speed updating and storing of electronic-commerce orders comprising:
   a server computer for receiving an electronic-commerce order;
   said server computer having a main memory write cache for storing said received electronic-commerce order;
   a disk drive; said disk drive including a plurality of cylinders for storing data;
   said server computer arranged to perform the steps of periodically transferring said stored electronic-commerce order data in said write cache to a predetermined temporary read/write cylinder of said disk drive;
   identifying a predefined storage threshold level for said predetermined temporary read/write cylinder;
   responsive to identifying said predefined threshold level, sequentially reading said stored electronic-commerce order data;
   identifying a customer type for said electronic-commerce order;
   responsive to identifying a predefined first customer type for said electronic-commerce order, and transferring said electronic-commerce order from said predetermined temporary read/write cylinder to a selected cylinder within a set number of cylinders from said predetermined temporary read/write cylinder; and
   responsive to identifying a predefined second customer type for said electronic-commerce order, and transferring said electronic-commerce order from said predetermined temporary read/write cylinder to a selected cylinder more than said set number of cylinders from said predetermined temporary read/write cylinder.

15. Apparatus for implementing enhanced, high speed updating and storing of electronic-commerce orders as recited in claim 14 wherein said disk drive includes a set number of outer diameter cylinders for storing electronic-commerce order data.

16. Apparatus for implementing enhanced, high speed updating and storing of electronic-commerce orders as recited in claim 15 wherein said predetermined temporary read/write cylinder is defined generally near the middle of said set number of outer diameter (OD) cylinders.

17. Apparatus for implementing enhanced, high speed updating and storing of electronic-commerce orders as recited in claim 14 wherein said predetermined temporary read/write cylinder is periodically reallocated to another cylinder of said disk drive, whereby wear is minimized.

18. Apparatus for implementing enhanced, high speed updating and storing of electronic-commerce orders as recited in claim 14 wherein product information is stored on a predefined number of inner diameter (ID) cylinders of said disk drive.

19. Apparatus for implementing enhanced, high speed updating and storing of electronic-commerce orders as recited in claim 14 wherein said predefined first customer type is a large sized or frequent customer.

20. Apparatus for implementing enhanced, high speed updating and storing of electronic-commerce orders as recited in claim 14 wherein said predefined second customer type is a small or medium sized customer.

21. A computer program product for implementing enhanced, high speed updating and storing of electronic-commerce orders in a server computer, said server computer having a main memory write cache and at least one disk drive, said computer program product including a plurality of computer executable instructions stored on a computer readable medium, wherein said instructions, when executed by said server computer, cause the server computer to perform the steps of:
   receiving an electronic-commerce order;
   storing said received electronic-commerce order in said main memory write cache;
   periodically transferring said stored electronic-commerce order data in said write cache to a predetermined temporary read/write cylinder of said disk drive;
   identifying a predefined storage threshold level for said predetermined temporary read/write cylinder;
   responsive to identifying said predefined threshold level, sequentially reading said stored electronic-commerce order data;
   identifying a customer type for said electronic-commerce order;
   responsive to identifying a predefined first customer type for said electronic-commerce order, and transferring said electronic-commerce order from said predetermined temporary read/write cylinder to a selected cylinder within a set number of cylinders from said predetermined temporary read/write cylinder; and
   responsive to identifying a predefined second customer type for said electronic-commerce order, and transferring said electronic-commerce order from said predetermined temporary read/write cylinder to a selected cylinder more than said set number of cylinders from said predetermined temporary read/write cylinder.

22. A computer program product for implementing enhanced, high speed updating and storing of electronic-commerce orders in a server computer as recited in claim 21 wherein said disk drive includes a set number of outer diameter cylinders for storing electronic-commerce order data and wherein said predetermined temporary read/write cylinder is defined generally near the middle of said set number of outer diameter (OD) cylinders.

* * * * *